United States Patent

Buer

[11] Patent Number: 5,967,330
[45] Date of Patent: *Oct. 19, 1999

[54] METHODS OF SEPARATING METAL CANS AND PLASTIC BOTTLES

[75] Inventor: Jeffrey J. Buer, Norwalk, Iowa

[73] Assignee: MidAmerica Recycling Company, Des Moines, Iowa

[*] Notice: This patent is subject to a terminal disclaimer.

[21] Appl. No.: 09/178,759

[22] Filed: Oct. 26, 1998

Related U.S. Application Data

[62] Division of application No. 08/882,486, Jun. 25, 1997.

[51] Int. Cl.⁶ ................ B03B 7/00; B03C 1/30
[52] U.S. Cl. .................... 209/12.1; 209/930; 209/38; 209/636; 198/580
[58] Field of Search ................ 209/10, 38, 930, 209/567, 636, 215, 289, 12.1; 406/122, 108, 39, 41; 198/580; 221/158, 159

[56] References Cited

U.S. PATENT DOCUMENTS

| | | | |
|---|---|---|---|
| 1,822,111 | 9/1931 | Richardson et al. | 198/580 |
| 3,701,419 | 10/1972 | Hutter et al. | 209/111.8 |
| 3,802,631 | 4/1974 | Boyd | 209/930 |
| 3,945,575 | 3/1976 | Marsh | 209/930 |
| 3,952,889 | 4/1976 | Wanker . | |
| 4,284,187 | 8/1981 | Kramer et al. | 198/580 |
| 4,440,284 | 4/1984 | DeWoolfson . | |
| 5,101,977 | 4/1992 | Roman | 209/3 |
| 5,116,486 | 5/1992 | Pederson . | |
| 5,361,909 | 11/1994 | Gemmer | 209/12.1 |
| 5,465,847 | 11/1995 | Gilmore | 209/12.1 |
| 5,535,891 | 7/1996 | Kuniyone et al. | 209/12.1 |
| 5,738,022 | 4/1998 | Reilly | 406/39 |

FOREIGN PATENT DOCUMENTS

| | | |
|---|---|---|
| 592960 | 5/1959 | Italy . |
| 632136 | 1/1962 | Italy . |

OTHER PUBLICATIONS

Copy—5 pages of Tectron Metal Detection brochure.

*Primary Examiner*—William E. Terrell
*Assistant Examiner*—Joe Dillon, Sr.
*Attorney, Agent, or Firm*—Henderson & Sturm

[57] ABSTRACT

The present invention relates to an improved method of removing and transporting empty, recyclable, aluminum and plastic beverage containers returned to redemption centers without requiring the redemption centers to sort the containers by distributor and then separate the containers into like materials for removal. The present invention also illuminates the burden imposed on the distributors from having to pick up the containers from the redemption centers, then shred or bale the materials, and then sell the materials to recyclers. The invention comprises the steps of collecting and depositing the aluminum and plastic containers into a single holding bin at the redemption center's facilities. Using a blower such as a centrifugal fan and chute to blow the contents of the holding bin into a transporter such as a semi-trailer or compactor. Transporting the transporter to a separating facility which automatically separates the aluminum and plastic containers into like materials. Then delivering to a recycling facility the separated beverage containers, thereby eliminating the need for the distributors to pick up their beverage containers from the redemption centers for delivery to recyclers.

22 Claims, 8 Drawing Sheets

METHODS OF SEPARATING METAL CANS AND PLASTIC BOTTLES

CROSS-REFERENCE TO RELATED APPLICATIONS

This is a division of Ser. No. 08/882,486, filed Jun. 25, 1997 by Jeffrey J. Buer which is incorporated herein by reference.

BACKGROUND OF INVENTION

1. Field of Application

The present invention relates to an improved method of collecting, removing and transporting aluminum and plastic beverage containers from a redemption center to a separating facility without requiring the redemption center to sort the beverage containers by specific beverage company or requiring the redemption center to separate the beverage containers into like materials. Additionally, the improved method relieves the beverage companies from the burden of having to remove the empty beverage containers from the redemption center

2. Description of Prior Art

Recyclable aluminum or plastic containers are used almost exclusively by beverage bottlers such as Coca Cola, Pepsi, Budweiser, etc. Many states, such as Iowa, Michigan, and others, have imposed statutory laws requiring the consumer to pay a deposit (usually five or ten cents) for each beverage container purchased from a dealer in order to encourage recycling of the containers. This deposit is then refunded when the consumer returns the recyclable container to a dealer or to a redemption center (both referred to hereinafter as redemption centers).

In states that impose this deposit requirement, the redemption centers are usually under a duty to accept the empty beverage containers and pay the amount of the refund value to the consumer upon return of the beverage containers. The distributors are then typically required to accept and pick up from the redemption centers any beverage containers of the kind, size and brand sold by the distributor and to reimburse the redemption centers for the containers collected. The distributors then shred and bale the empty beverage containers and sell the plastic and aluminum to recyclers.

Since the distributors are under a duty to accept and reimburse the redemption centers for only the kind, size and brand of the beverage containers which they sell, the redemption centers must sort the cans by distributor and by material type (i.e. aluminum or plastic). For example, the redemption centers must separate plastic Coke bottles from plastic Pepsi bottles and aluminum Coke cans from aluminum Pepsi cans. This imposition takes time and increases costs for the redemption centers.

In order to reduce costs and increase efficiency, the redemption centers have taken great measures to try to find ways of keeping track of each distributor's returned beverage containers as well as keeping the plastic and aluminum containers separate from the time they are returned by the consumer. One of the methods used by the redemption centers to keep the plastic and aluminum containers separate as well as track each distributor's returned beverage containers, is the use of reverse vending machines of the type disclosed in the patent issued to DeWoolfson et al, U.S. Pat. No. 4,579,216 which is incorporated herein by reference.

Reverse vending machines are similar to beverage dispensing vending machines except that instead of depositing coins and receiving a bottle or can of soda, the user deposits his or her empty plastic or aluminum beverage containers into the machine in return for money in an amount equal to the deposit. Other reverse vending machines merely return a receipt or voucher which the user must tender to an employee of the redemption center to collect his or her deposit.

Most reverse vending machines count the containers as they are being deposited and also read a bar code on the containers to determine the distributor. Separate reverse vending machines are usually required, each receiving only plastic or aluminum containers ranging in size from large two-liter plastic bottles to smaller twelve ounce bottles or cans. The plastic bottles and aluminum cans are collected in hoppers housed within the separate reverse vending machines. The hoppers must be emptied periodically into larger holding bins where the plastic bottles and aluminum cans remain separate at all times. The distributors then periodically haul away an equivalent number of bottles and cans from the recycling depository rather than just hauling away their own brand of bottles and cans.

Although the reverse vending machines have eliminated the need for the redemption centers to manually sort the beverage containers by distributors, these reverse vending machines are relatively expensive and they impose a burden on the consumer who must insert the cans and bottles into separate reverse vending machines one at a time, wait for a receipt, and then take the receipt to a clerk at the redemption center to receive his or her deposit refund. Further, the distributors are still required to pick up an equivalent number of returned beverage containers from the redemption centers.

Therefore, there is a need for a more efficient way to eliminate the burden and costs imposed on consumers and redemption centers to sort the recyclable beverage containers by distributor and then separate the containers into like materials. Additionally, there is a need to eliminate the burden on the distributors from having to pick up the empty beverage containers from the redemption centers, who must then have to shred and bale the materials, and then try to sell the materials to recyclers at the best market price.

BRIEF SUMMARY OF THE INVENTION

The present invention relates to a method of collecting and depositing the aluminum and plastic containers into a single holding bin at the redemption center's facilities. A blower, such as a centrifugal fan and chute, is used to blow the contents of the holding bin into a transporter such as a semi-trailer or compactor or other enclosed hauling vehicle. Alternatively, the containers can be dumped directly into a compactor. A transporter is used to transport the containers to a separating facility to automatically separate the aluminum and plastic containers into like materials. The separated materials are then delivered to a recycling facility, thereby eliminating the need for the distributors to pick up their beverage containers from the redemption centers for delivery to recyclers.

Therefore it is an object of the present invention to provide an improved method of removing and transporting empty, recyclable, aluminum and plastic beverage containers returned to redemption centers.

It is a further object of the present invention to eliminate the need for the redemption centers from having to sort the returned beverage containers by material type (i.e. aluminum and plastic).

It is still a further object of the present invention to eliminate the need for the redemption centers from having to sort the returned beverage containers by distributor.

It is still a further object of the present invention to eliminate the burden on the distributors from having to pick up the returned beverage containers from the redemption centers, then having to shred and bale the containers, and then having to try sell the materials to recyclers.

Other objects, advantages, and novel features of the present invention will become apparent from the following detailed description of the invention when considered in conjunction with the accompanying drawings.

DETAILED DESCRIPTION OF THE INVENTION

Figure 1:
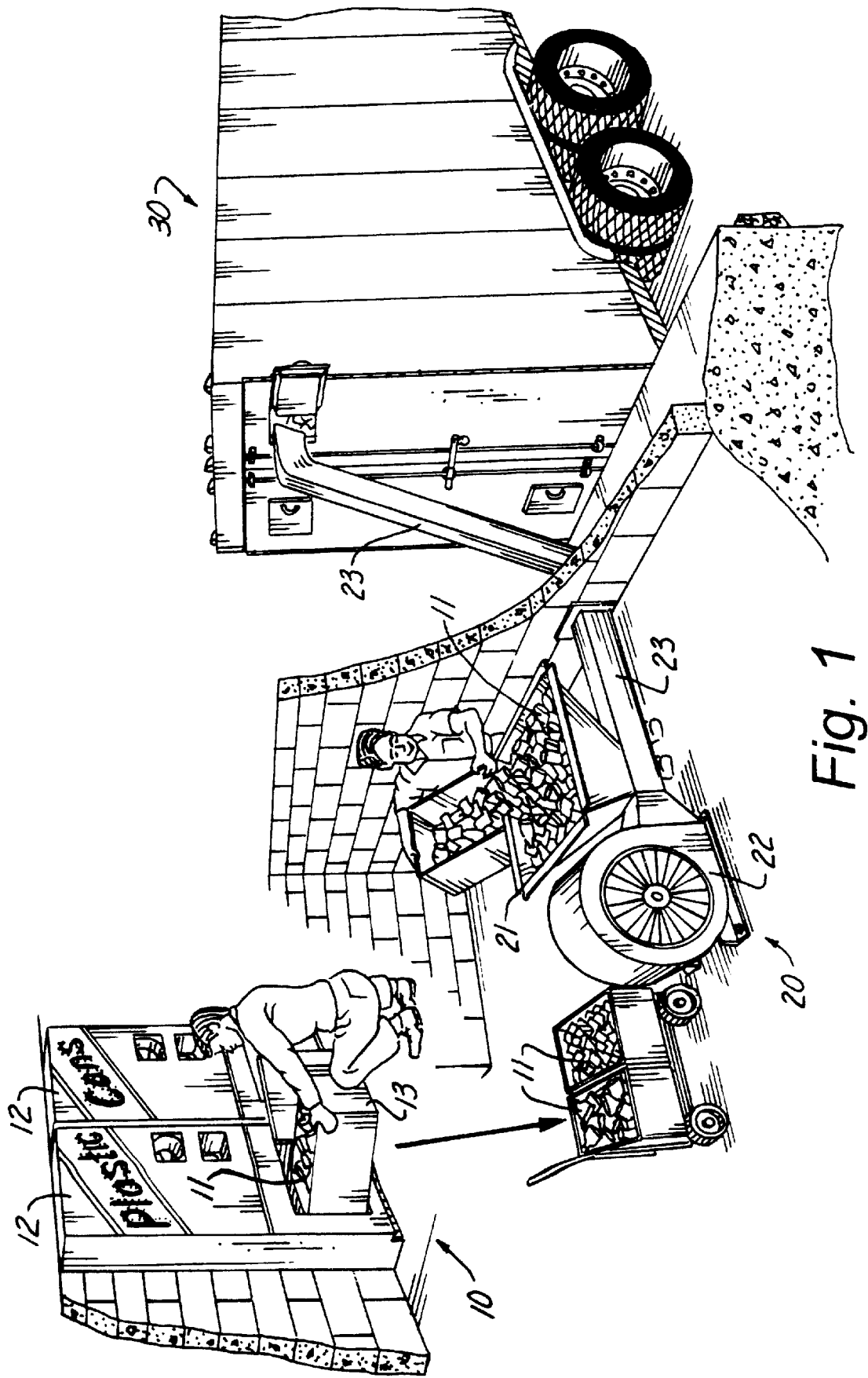
FIG. 1 illustrates a first embodiment of the improved method for collecting and removing recyclable aluminum and plastic beverage containers from a dealer or redemption center.

Referring now to the drawings wherein like reference numerals designate identical or corresponding parts throughout the several views, FIG. 1 shows a collecting area (10) typically located near a redemption center's facilities. An individual is shown removing recyclable beverage containers (11) from reverse vending machines (12) of the type disclosed, for example, in U.S. Pat. No. 4,579,216 to DeWoolfson et al. The recyclable beverage containers (11) are collected in hoppers (13) within the reverse vending machines (12). The recyclable beverage containers (11) are then carried to and deposited into a holding bin (21) connected to a blowing machine (20). The beverage containers (11) now within the holding bin (21) are blown by a centrifugal fan (22) through a chute (23) into a transporter (30). When the transporter (30) is full, it is transported to a separating facility (40) (see FIGS. 4 and 5) where the beverage containers (11) are unloaded into a DUMPSTER® (51). The empty transporter (30) is then returned to the redemption center's facilities to be filled with more recyclable beverage containers (11).

Figure 2:
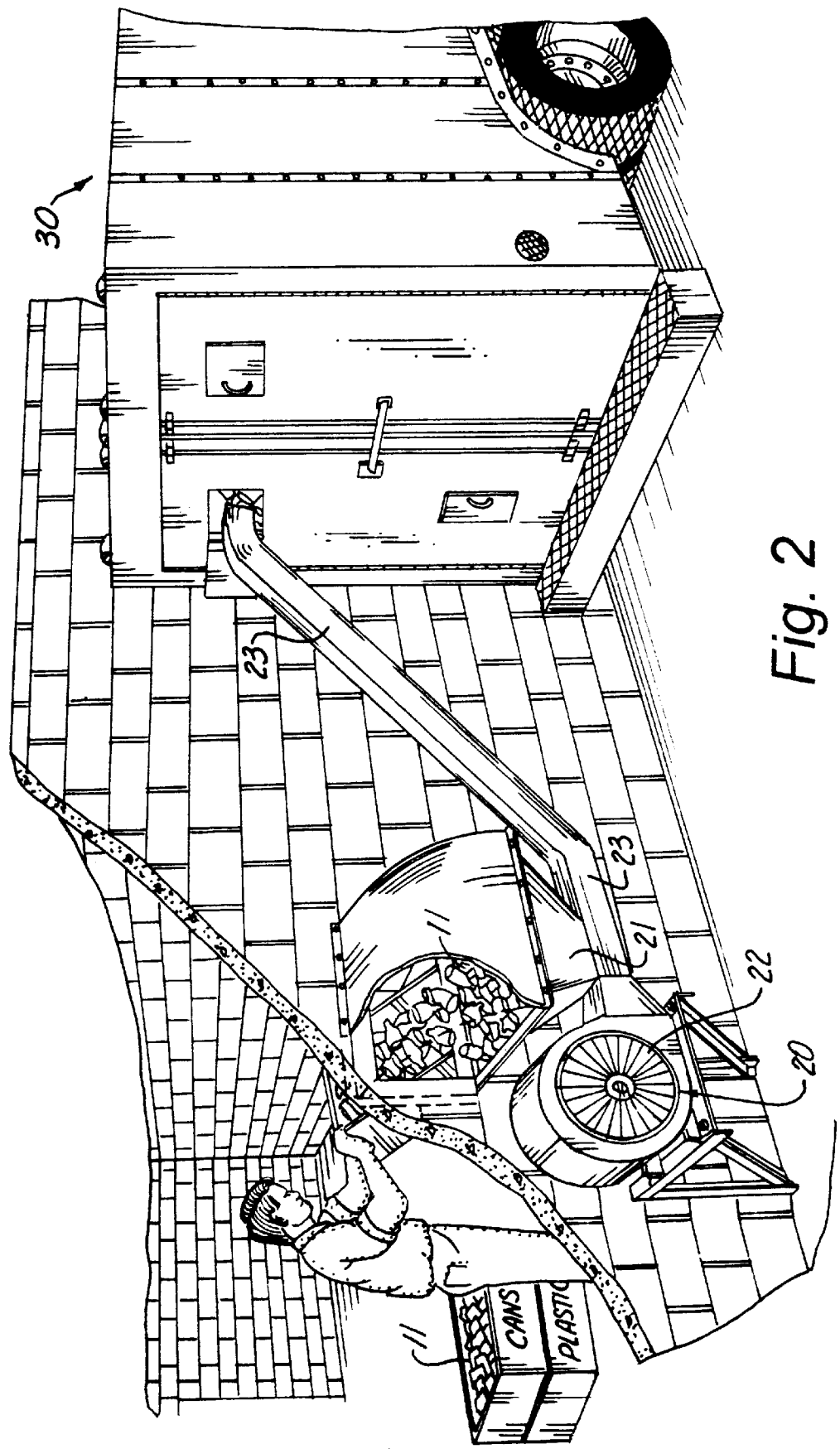
FIG. 2 illustrates a second embodiment of the improved method for collecting and removing recyclable aluminum and plastic beverage containers from a dealer or redemption center.
Figure 3:
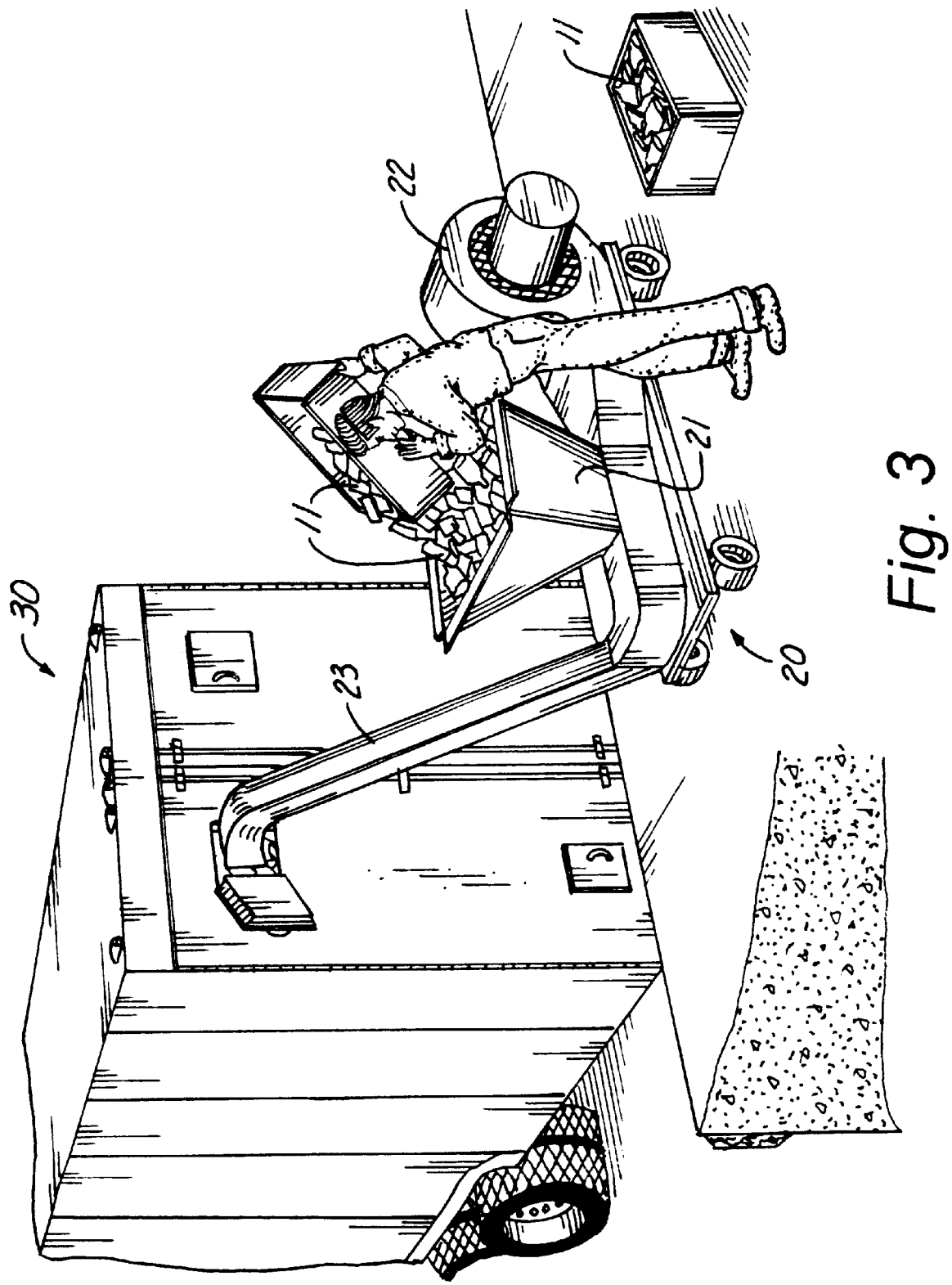
FIG. 3 illustrates a third embodiment of the improved method for collecting and removing recyclable aluminum and plastic beverage containers from a dealer or redemption center.

FIGS. 2 and 3 show alternative arrangements which may be found at the redemption center's facilities for depositing the beverage containers (11) into the holding bin (21) of the blowing machine (20). It should be understood that recyclable beverage containers (11) need not be collected by the reverse vending machines (12). The beverage containers (11) may be collected in any type of hopper (13) such as a sturdy box, or bag, or the beverage containers (11) can be directly deposited into the hopper (21) by the consumers as the containers (11) are returned for redemption.

Figure 4:
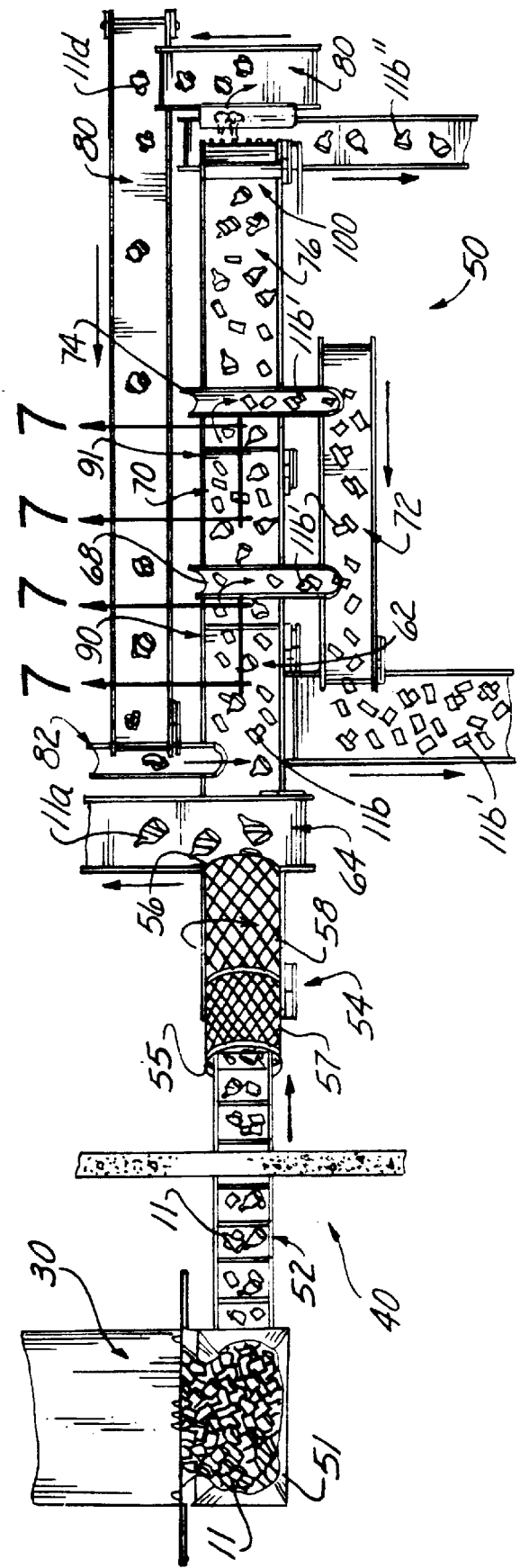
FIG. 4 is a plan view of the preferred apparatus used to separate the aluminum and plastic beverage containers at a separating facility.
Figure 5:
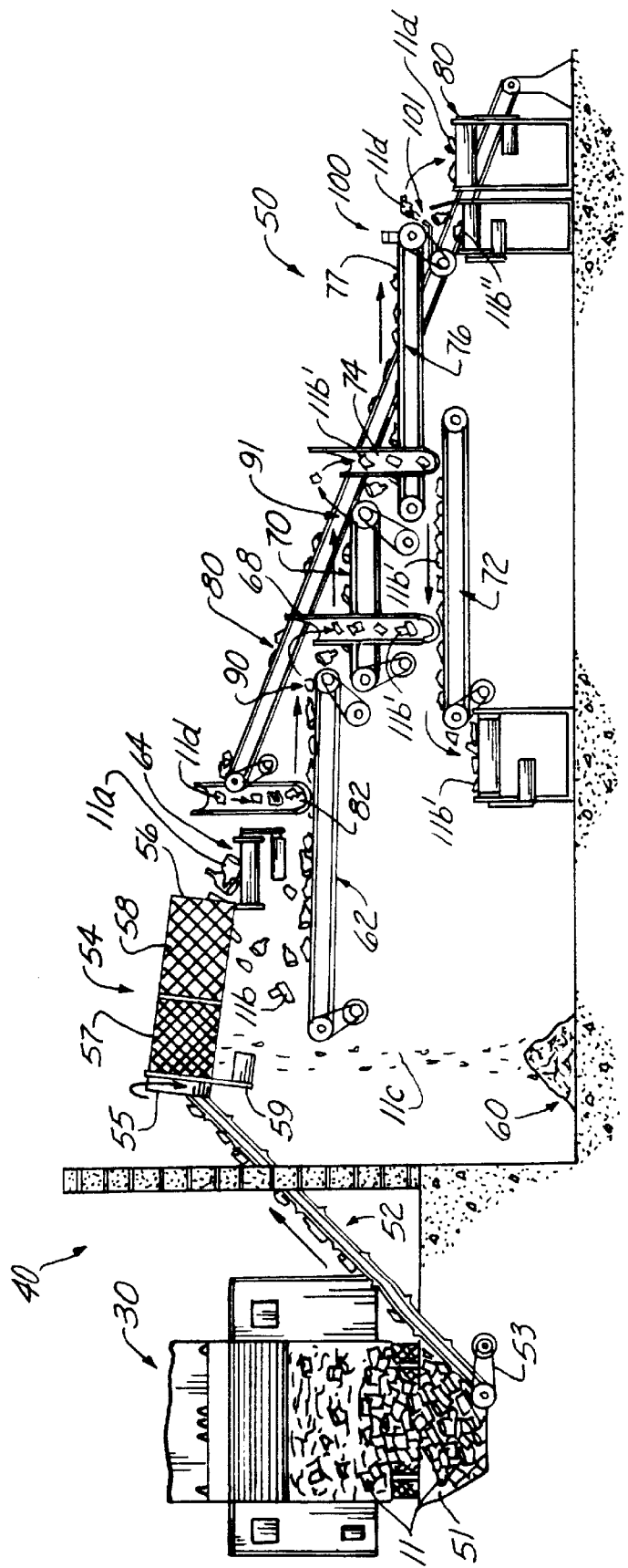
FIG. 5 is an elevation view of the preferred apparatus used to separate the aluminum and plastic containers at a separating facility.
Figure 6:
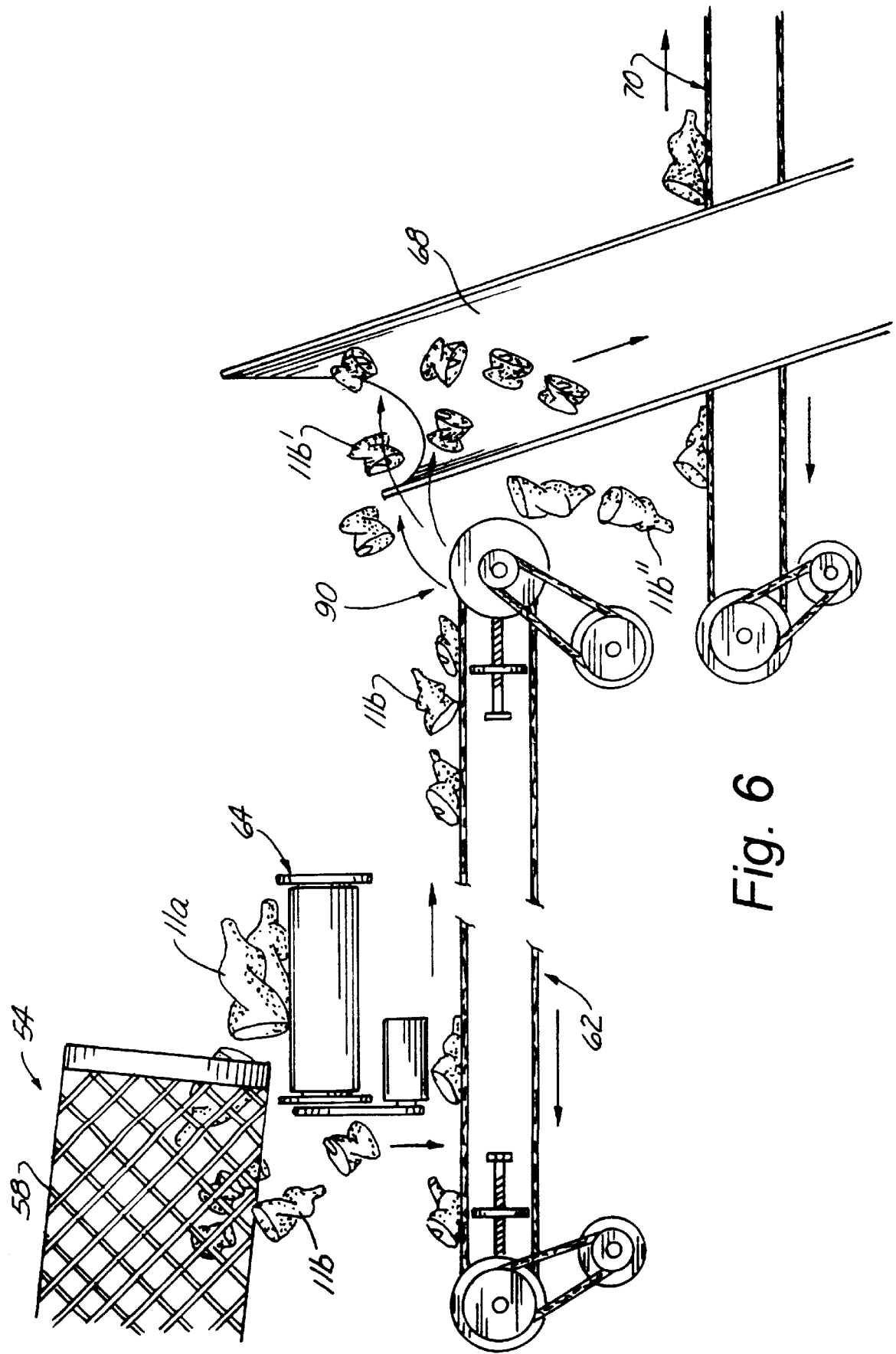
FIG. 6 is a close up view of the size separator and metal separator.
Figure 7:
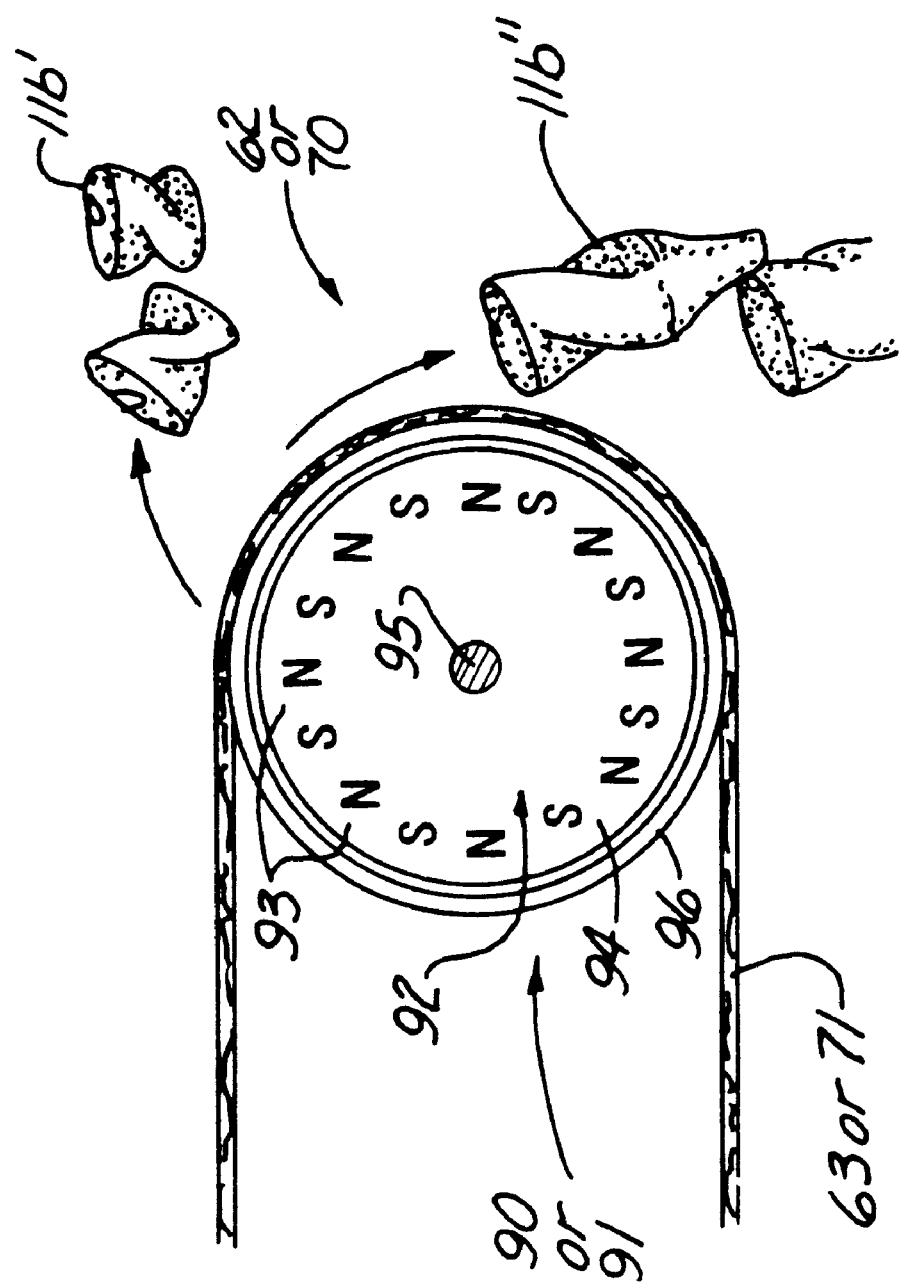
FIG. 7 is a cross sectional view of the metal separator taken along lines 7—7 of FIG. 4.
Figure 10:
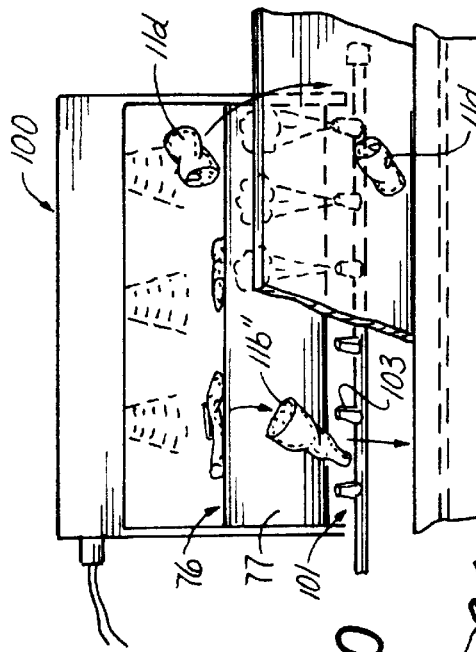
FIG. 10 is a cross sectional view of the air discharge device taken along lines 10—10 of FIG. 8.
Figure 9:
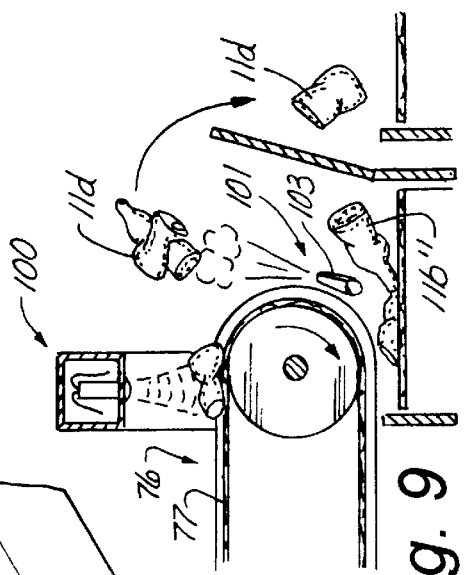
FIG. 9 is a cross-sectional view of the metal detector and air discharge device taken along lines 9—9 of FIG. 8.
Figure 8:
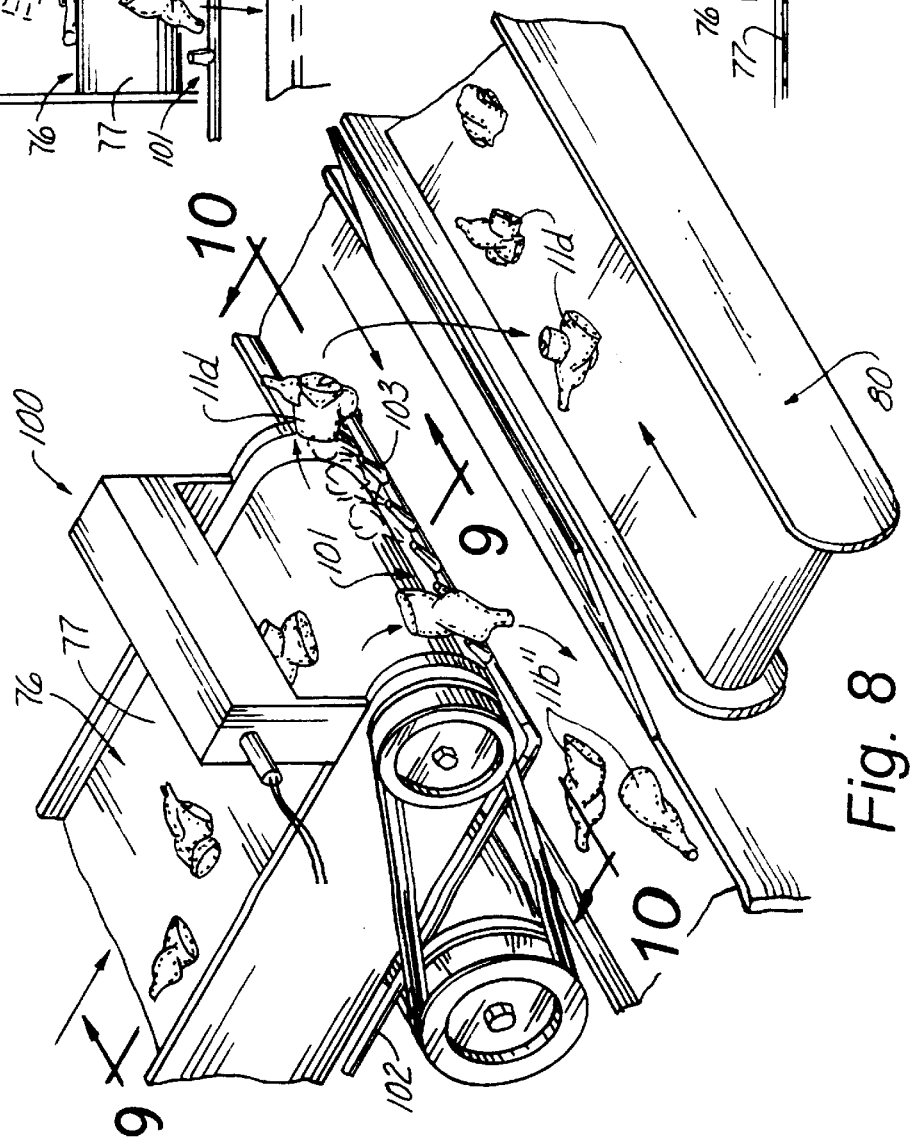
FIG. 8 is a close up view of the end of the third conveyor showing the metal detector and air discharge device.

Referring now to FIGS. 4 and 5 which show respectively a plan view and an elevation view of a separating apparatus (50) at a separating facility (40). The transporter (30) is shown unloading the recyclable beverage containers (11) consisting of containers of large size (11a), intermediate size (11b), and fine particles (11c), into a DUMPSTER® (51). A conveyor (52), powered by an electric motor and belt (53), conveys the beverage containers (11) into a two-stage drum screen (54) of cylindrical shape and having a first end (55) and a second end (56). The two-stage drum screen (54) has a first screen (57) of relatively fine mesh toward its first end (55) and a second screen (58) of intermediate sized mesh openings toward its second end (56). The drum screen (54) is rotatable about its longitudinal axis by a motor and belt mechanism (59) and is disposed in a downward sloping position wherein the first end (55) is higher in elevation than the second end (56).

In operation, as the conveyor (52) deposits the beverage containers (11) into the first end (55) of the rotating two-stage drum conveyor (54), the fine particles (11c) drop through the first screen (57) and are collected in a fine particle collecting area (60). If desired, these fine particles can be separated again using a metal separator (discussed below) for example into plastic parts such as plastic rings off bottle caps and aluminum tabs from cans. As the drum screen (54) continues to rotate, the intermediate sized containers (11b) fall through the second screen (58) where they are collected on a first conveyor (62). The large sized containers (11a), which are too large to fall through the second screen (58), continue to rotate within the drum screen (54) until they are discharged out the second end (56) of the downward sloping drum screen (54) onto a second conveyor (64). The large sized containers (11a), typically of the plastic two liter size bottles, are conveyed by the second conveyor (64) to large plastic container collecting area where they may be shredded or baled for recycling or further sorted.

The intermediate sized containers (11b), including both aluminum cans (11b') and plastic bottles (11b"), on the first conveyor (62) are conveyed past a first metal separator (90) which separates a significant portion of the aluminum cans (11b') from the plastic bottles (11b"). The aluminum cans (11b') are repelled by the first metal separator (90) into a first chute (68) while the remaining intermediate sized containers (11b) are deposited onto a third conveyor (70). These remaining intermediate sized containers (11b) are then conveyed past a second metal separator (91) which repels an even more significant portion of aluminum cans (11b') into a second chute (74) The separated aluminum cans (11b') are then carried by the first and second chutes (68 and 74) to a fourth conveyor (72) which conveys the aluminum cans (11b') to an aluminum can collecting area where they may be shredded or baled for shipment to a recycling facility. The metal separators (90 and 91) are discussed in further detail below.

The remaining intermediate sized containers (11b)) not repelled by the second metal separator (91) are deposited onto a fifth conveyor (76) and then conveyed past a metal detector (100) that detects if there are any remaining metallic items among the plastic bottles (11b"). If the metal detector (100) detects any metallic objects remaining on the fifth conveyor (76) a signal is sent by the metal detector (100) to activate an air discharge mechanism (101) (discussed below) which will discharge a burst of air, thereby blowing the metallically contaminated items (11d) onto a sixth conveyer (80). The metallically contaminated items (11d) are then carried by this sixth conveyor (80) and deposited into a third chute (82) where the metallically contaminated items (11d) are discharged back onto the first conveyor (62) where they will be recirculated through the separating apparatus (50) until all metallic and non-metallic items are separated and collected into their respective areas of like materials. The remaining plastic containers (11b"), not removed by the air discharger (101), are conveyed to an intermediate size plastic bottle collecting area where they may be shredded or baled for shipment to a recycling facility.

Referring now to FIG. 5, the first and second metal separators (90 and 91) can, for example, be of a type manufactured by Dings Co. of 4740 W. Electric Avenue, Milwaukee, Wis. 53219. The metal separators (90 and 91) are comprised of a magnetic rotor (92) which includes a series of permanent magnets (93) mounted on a support plate (94) attached to a shaft (95). The magnetic rotor (92) is surrounded by, but not attached to, a ceramic covered fiberglass wear shell (96) which supports the conveyor belts (63 or 71) of the first conveyor (62) or the third conveyor (70) respectively. This allows the magnetic rotor (92) to spin independently and at a much higher speed than the wear shell (96) and the conveyor belts (63 or 71). When a piece of nonferrous metal, such as an aluminum can (11b') passes over the separator (90 or 91), the magnets (93) inside the shell rotate past the aluminum can (11b') at high speed (approximately 2000 rpm). The rotation of the magnets (93) forms eddy currents in the aluminum can (11b') which in turn create a magnetic field around the aluminum can (11b'). The polarity of that magnetic field is the same as the rotating magnet (93), causing the aluminum can (11b') to be repelled away from the magnet (93). This repulsive force makes the trajectory of the aluminum can (11b') greater than that of the nonmetallic plastic bottles (11b"), thereby allowing the aluminum cans (11b40) to be separated and deposited into the chutes (68 and 74)

Referring now to FIG. 5, the metal detector (100) which can be of the type manufactured by Tectron Metal Detection of Irvine, Calif., and air discharge device (101) are shown positioned toward the end of the fifth conveyor (76). The air discharge device (101) is connected to an air compressor (not shown) having a discharge pipe (102) to carry air into the air discharge device (101). One end of the air discharge pipe (102) having a plurality of discharge ports (103) is positioned under the conveyor belt (77) of the conveyor (76). When the metal detector (100) detects metallically contaminated items (11d) passing below it, a signal is sent to the air discharge device (101) to release, at the proper time, a burst of air through the ports (103) of sufficient force to blow the metallically contaminated items (11d) from the fifth conveyor (76) to the sixth conveyor (80) so that the metallically contaminated items (11d) may be recirculated through the separating process as described above. It should be appreciated that the metal detector (100) and air discharge device (101) may be programmed such that all of the discharge ports (103), or only certain ports (103), will open at the appropriate times to discharge the metallically contaminated items (11d) onto the sixth conveyor (80).

It should also be understood that plastic containers (11b") will often be blown onto the sixth conveyor (80) along with the contaminated items (11d) especially if all the ports (103) discharge an air burst at the same time. These plastic containers are simply recirculated through the separating process until all the containers are sorted into like materials.

Accordingly, it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method comprising:
   (a) depositing said aluminum and plastic beverage containers into a storage device;
   (b) conveying said aluminum and plastic beverage containers past a first metallic separator, wherein said first metallic separator causes a significant portion of said aluminum containers to be repelled into an aluminum container collecting area;
   (c) conveying remaining containers on a conveyor past a second metallic separator, wherein said second metallic separator causes an even more significant portion of aluminum containers to be repelled into said aluminum container collecting area;
   (d) conveying said remaining containers past a metal detector thereby determining if said remaining containers are metallically contaminated;
   (e) selectively removing metallicaly contaminated container from said conveyor;
   (f) collecting non-metallically contaminated container in a primarily whole condition into a plastic container collecting area; and
   (g) recirculating said metallically contaminated containers back through steps a, b, c, d, e, and f until all metallic and non-metallic containers are separated and collected in their respective areas of like materials.

2. The method of claim 1 wherein said first metallic separator of step (b) includes employing eddy currents to separate said aluminum containers.

3. The method of claim 1 wherein said second metallic separator of step (c) includes employing eddy currents to separate said aluminum containers.

4. The method of claim 1 wherein said step (e) for selectively removing metallically contaminated items includes employing an air discharging mechanism.

5. A method comprising:
   (a) depositing primarily aluminum and plastic beverage containers into a storage device;
   (b) conveying said aluminum and plastic beverage containers to a size separator, thereby separating said items by size into fine particles, intermediate sized containers and large sized containers;
   (c) collecting said fine particles in a fine particle collecting area;
   (d) conveying said large sized containers to a large plastic container collecting area;
   (e) conveying said intermediate sized containers past a first metallic separator, wherein said first metallic separator causes a significant portion of aluminum containers to be discharged into an aluminum container collecting area;
   (f) conveying remaining containers on a conveyor past a second metallic separator, wherein said second metallic separator causes an even more significant portion of aluminum containers to be discharged into said aluminum container collecting area;

(g) conveying said remaining containers on said conveyor past a metal detector thereby determining if said remaining containers are metallically contaminated;

(h) selectively removing metallically contaminated containers from said conveyor;

(i) collecting non-metallically contaminated containers in a primarily whole condition into an intermediate size plastic container collecting area; and (j) recirculating said metallically contaminated items back through steps a, b, c, d, e, f, g, h and i until all metallic and non-metallic containers are separated and collected in their respective areas of like materials.

6. The method of claim 5 wherein said size separator of step (b) includes a downward sloping, two-stage drum screen being rotatable about a longitudinal axis, wherein said first stage of said two-stage drum screen includes a fine screen and the second stage of said two-stage drum screen includes an intermediate sized screen.

7. The method of claim 5 wherein rotation of said two stage drum screen causes fine particles to fall through said first stage screen, intermediate sized containers fall through said second stage; and large sized containers continue through the length of said two-stage drum screen.

8. The method of claim 5 wherein said first metallic separator of step (e) includes employing eddy currents to separate metallic items.

9. The method of claim 5 wherein said second metallic separator of step (f) includes employing eddy currents to separate metallic items.

10. The method of claim 5 wherein said step (h) for selectively removing metallically contaminated items includes employing an air discharging mechanism.

11. A method comprising:

(a) depositing aluminum and plastic beverage containers into a storage device;

(b) conveying said aluminum and plastic beverage containers to a size separator, wherein fine particles, which are particles smaller than the size of a whole container, are collected into a fine particle collecting area, intermediate sized containers are collected onto a first conveyor; and large sized containers are collected onto a second conveyor;

(c) conveying said large sized containers on said second conveyor to a large plastic container collecting area;

(d) conveying said intermediate sized containers on said first conveyor past a first metallic separator, wherein said first metallic separator causes a significant portion of aluminum containers to be discharged into a first chute and deposited onto a fourth conveyor while the remaining containers and fine particles are deposited onto a third conveyor;

(e) conveying said aluminum containers on said fourth conveyor to an aluminum container collecting area;

(f) conveying remaining containers on said third conveyor past a second metallic separator, wherein said second metallic separator causes an even more significant portion of aluminum containers to be discharged into a second chute and deposited onto said fourth conveyor to be carried to said aluminum container collecting area while the remaining containers are deposited onto a fifth conveyor;

(g) conveying said remaining containers in a primarily whole condition on said fifth conveyor past a metal detector thereby determining if said remaining containers are metallically contaminated;

(h) selectively removing metallically contaminated containers and fine particles from said fifth conveyor onto a sixth conveyor, all non-metallically contaminated containers not selectively removed are conveyed to an intermediate sized plastic container collecting area;

(i) conveying said metallically contaminated containers and fine particles on said sixth conveyor and depositing them into a third chute which in turn deposits said metallically contaminated items back onto said first conveyor thereby recirculating said metallically contaminated items back through steps a, b, c, d, e, f, g and h until all plastic and aluminum items are separated and collected in their respective areas of like materials.

12. The method of claim 11 wherein said first metallic separator of step (d) includes employing eddy currents to separate metallic items.

13. The method of claim 11 wherein said second metallic separator of step (f) includes employing eddy currents to separate metallic items.

14. The method of claim 11 wherein said step (h) for selectively removing metallically contaminated items includes employing an air discharging mechanism.

15. The method of claim 11 wherein said size separator of step (b) includes a downward sloping, two-stage drum screen being rotatable about a longitudinal axis, wherein said first stage of said two-stage drum screen includes a fine screen and the second stage of said two-stage drum screen includes an intermediate sized screen.

16. The method of claim 15 wherein rotation of said two stage drum screen causes fine particles to fall through said first stage screen, intermediate sized containers fall through said second stage; and large sized plastic containers continue through the length of said two-stage drum screen.

17. A method of collecting and removing aluminum and plastic beverage containers from a redemption center and transporting them to a separating facility, said method comprising:

(a) collecting aluminum and plastic beverage containers in a single holding bin at said redemption center;

(b) blowing said aluminum and plastic beverage containers from said holding bin into a transporter;

(c) transporting said transporter to said separating facility;

(d) depositing said aluminm and plastic beverage containers into a storage device;

(e) conveying said aluminum and plastic beverage containers past a first metallic separator, wherein said first metallic separator causes a significant portion of said aluminum containers to be repelled into an aluminum container collecting area;

(f) conveying remaining containers on said conveyor past a second metallic separator, wherein said second metallic separator causes an even more significant portion of aluminum containers to be repelled into said aluminum container collecting area;

(g) conveying said remaining containers past a metal detector thereby determining if said remaining items are metallically contaminated;

(h) selectively removing metallically contaminated items from said conveyor;

(i) collecting non-metallically contaminated items into a plastic container collecting area; and (j) recirculating said metallically contaminated items back through steps a, b, c, d, e, f, g, h and I until all metallic and non-metallic items are separated and collected in their respective areas of like materials.

18. The method of claim 17 wherein said first metallic separator of step (b) includes employing eddy currents to separate said aluminum containers.

19. The method of claim 17 wherein said second metallic separator of step (c) includes employing eddy currents to separate said aluminum containers.

20. The method of claim 17 wherein said step (e) for selectively removing metallically contaminated items includes employing an air discharging mechanism.

21. A method of automatically separating combined aluminum and plastic beverage containers into like materials comprising:

(a) depositing said aluminum and plastic beverage containers into a storage device;

(b) conveying said aluminum and plastic beverage containers past a first metallic separator, wherein said first metallic separator causes a significant portion of said aluminum containers to be repelled into an aluminum container collecting area;

(c) conveying said remaining containers past a metal detector thereby determining if said remaining containers are metallically contaminated;

(d) selectively removing metallically contaminated containers from a conveyor;

(e) collecting non-metallically contaminated primarily whole plastic containers into a plastic container collecting area; and (f) recirculating said metallically contaminated containers back through steps a, b, c, d, and e until all metallic and non-metallic containers are separated and collected in their respective areas of like materials.

22. A method of automatically separating combined aluminum and plastic beverage containers into like materials comprising:

(a) depositing Said aluminum and plastic beverage containers into a storage device;

(b) conveying said aluminum and plastic beverage containers past a first metallic separator, wherein said first metallic separator causes a significant portion of said aluminum containers to be repelled into an aluminum container collecting area;

(c) conveying remaining containers on a conveyor past a second metallic separator, wherein said second metallic separator causes an even more significant portion of aluminum containers to be repelled into said aluminum container collecting area;

(d) selectively removing metallically contaminated containers from said conveyor; and (e) collecting non-metallically contaminated primarily whole containers into a plastic container collecting area.

\* \* \* \* \*